(12) United States Patent
Liu et al.

(10) Patent No.: US 11,338,384 B2
(45) Date of Patent: May 24, 2022

(54) NUMERICAL CONTROL PLASMA SPECIAL-SHAPED CUTTING MACHINE TOOL

(71) Applicant: Beijing Jinsuohengdun Protective Equipment Co., Ltd, Beijing (CN)

(72) Inventors: Guoxi Liu, Beijing (CN); Tianyu Lan, Beijing (CN); Weiwei Li, Beijing (CN)

(73) Assignee: Beijing Jinsuohengdun Protective Equipment Co., Ltd, Beijing (CN)

( * ) Notice: Subject to any disclaimer, the term of this patent is extended or adjusted under 35 U.S.C. 154(b) by 194 days.

(21) Appl. No.: 16/516,953

(22) Filed: Jul. 19, 2019

(65) Prior Publication Data

US 2020/0156175 A1 May 21, 2020

(30) Foreign Application Priority Data

Nov. 19, 2018 (CN) .......................... 201811377426.3

(51) Int. Cl.
*H05H 1/34* (2006.01)
*B23K 37/02* (2006.01)
(Continued)

(52) U.S. Cl.
CPC ........ *B23K 10/006* (2013.01); *B23K 37/0211* (2013.01); *B23K 37/0258* (2013.01);
(Continued)

(58) Field of Classification Search
CPC .............. B23K 10/006; B23K 37/0211; B23K 37/0258; B23K 37/0288; H05H 1/34; H05H 1/26; H05H 1/36
(Continued)

(56) References Cited

U.S. PATENT DOCUMENTS 6,222,155 B1 * 4/2001 Blackmon .............. B23K 7/002
219/121.39
6,841,033 B2 * 1/2005 Condrashoff ..... H01J 37/32743
118/719
(Continued)

FOREIGN PATENT DOCUMENTS

CN 201862927 U 6/2011
CN 201950381 U 8/2011
(Continued)

*Primary Examiner* — Sang Y Paik
*Assistant Examiner* — Erwin J Wunderlich
(74) *Attorney, Agent, or Firm* — Harness, Dickey & Pierce, P.L.C.

(57) ABSTRACT

The present disclosure discloses a numerically-controlled plasma special-shaped cutting machine tool including a bracket, a cross beam, a feeding mechanism, a clamping mechanism, a gun head moving mechanism, a material conveying system, a material receiving device, a dedusting system, an electrical control system, and an outer cover. The present disclosure adopts plasma cutting, and the surface quality is obviously improved. Material conveying and cutting are performed by a predetermined program programmed in advance, and the dimensional precision of the machining is well ensured. Workers only need to place a workpiece material on the material conveying system, and the machine tool can perform automatic cutting. The labor intensity of the workers is greatly reduced, the cutting is continuously performed, and the machining efficiency is remarkably improved.

7 Claims, 11 Drawing Sheets

(51) Int. Cl.
  *B23K 37/047*  (2006.01)
  *H05H 1/26*    (2006.01)
  *B23K 10/00*   (2006.01)
  *H05H 1/36*    (2006.01)
(52) U.S. Cl.
  CPC ........ *B23K 37/0288* (2013.01); *B23K 37/047* (2013.01); *H05H 1/26* (2013.01); *H05H 1/34* (2013.01); *H05H 1/36* (2013.01)
(58) Field of Classification Search
  USPC ............ 219/121.39, 121.44, 121.48, 121.56, 219/121.58
  See application file for complete search history.

(56) References Cited

U.S. PATENT DOCUMENTS

| | | | | |
|---|---|---|---|---|
| 7,071,441 B1* | 7/2006 | Bulle | ................... | B23K 10/00 219/121.39 |
| 7,947,919 B2* | 5/2011 | Sukhman | .............. | B08B 7/0042 219/121.67 |
| 9,604,304 B2* | 3/2017 | Myers | ................ | B23K 37/0258 |
| 10,449,619 B2* | 10/2019 | Williams | ........... | B23Q 17/2404 |
| 2002/0084259 A1* | 7/2002 | Bertuzzi | ............ | B23K 37/0408 219/121.39 |
| 2009/0071944 A1* | 3/2009 | Forlong | ................... | B23K 7/06 219/121.39 |
| 2010/0275794 A1* | 11/2010 | Silchenstedt | ............ | G01D 1/00 101/4 |

FOREIGN PATENT DOCUMENTS

| | | |
|---|---|---|
| CN | 202428103 U | 9/2012 |
| CN | 106001953 A | 10/2016 |
| CN | 107052547 A | 8/2017 |
| CN | 206544070 U | 10/2017 |
| KR | 20140067735 A | 6/2014 |

\* cited by examiner

NUMERICAL CONTROL PLASMA SPECIAL-SHAPED CUTTING MACHINE TOOL

CROSS-REFERENCE TO RELATED APPLICATIONS

This application claims priority to Chinese application number 201811377426.3, filed Nov. 19, 2018, with a title of NUMERICALLY-CONTROLLED PLASMA SPECIAL-SHAPED CUTTING MACHINE TOOL. The above-mentioned patent application is incorporated herein by reference in its entirety.

TECHNICAL FIELD

The present disclosure relates to the technical field of manufacturing of civil air-defense engineering protective equipment, and in particular to a numerically-controlled plasma special-shaped cutting machine tool.

BACKGROUND

A civil air defense door leaf is formed by carrying out assembly welding of groove steel and I steel to form a framework and then welding steel plates on both sides of the framework. The splicing of the framework is insertion. There are three cases: groove steel is inserted into groove steel, I steel is inserted into I steel, and groove steel is inserted into I steel. For this purpose, it is required to machine both ends of the groove steel and the I steel into shapes corresponding to the groove steel and the I steel.

At present, the first method is to adopt manual gas cutting machining, that is, the shape of the end is drawn by using a sample plate and the shape is formed by manual oxy-acetylene flame cutting. The method has problems of large dimensional error after cutting, poor surface quality, excessive gap after insertion, difficulty in welding, large welding deformation, high labor intensity of workers and low machining efficiency. The second method is stamping forming, namely one-time stamping forming by using a die on a press or a punch press. This method requires the manufacturing of a special die. Since there are many types of groove steel and I steel and dies need to be manufactured for each model, the die manufacturing cost is high. Moreover, the die wear is very serious. Each die needs to be replaced after being punched about 2000 times, and the use cost is greatly increased.

It can be seen that the machining dimensional accuracy and surface quality of special insertion shapes of both ends of existing groove steel and I steel cannot be ensured, and in the machining process, the labor intensity of workers is high, the production efficiency is low, and the machining cost is high.

SUMMARY

An objective of the present disclosure is to provide a numerically-controlled plasma special-shaped cutting machine tool, to solve the above problems in the prior art, which significantly improves machining accuracy and surface quality, reduces labor intensity of workers and improves production efficiency.

To achieve the above purpose, the present disclosure provides the following technical solutions.

A numerically-controlled plasma special-shaped cutting machine tool includes: a bracket, a cross beam, a feeding mechanism, a clamping mechanism, a gun head moving mechanism, a material conveying system, a material receiving device, a dedusting system, an electrical control system, and an outer cover; where the cross beam and the clamping mechanism are fixed at the front end of the bracket, the feeding mechanism is mounted on the middle portion of the bracket, the gun head moving mechanism is mounted on the cross beam, a gun head is mounted on the gun head moving mechanism to cut a workpiece, and the gun head is connected with a plasma generator; the material conveying system is mounted at one end of the bracket and used for conveying the workpiece into the feeding mechanism; the material receiving device is disposed at the other end of the bracket and used for receiving a finished workpiece formed by cutting and conveying the finished workpiece into a material box outside the machine tool; and the dedusting system is connected to the outer cover and used for collecting and purifying smoke dust generated during cutting.

The cross beam may be a door type structural frame which is mounted on the bracket, the workpiece passes through the middle of the cross beam, and the gun head moving mechanism is mounted on an upper beam of the cross beam; the electrical control system is integrated in a control box, and the control box is mounted on the cross beam.

The feeding mechanism may include a fixing gripper, a mobile feeder, and a mobile transmission device; the fixing gripper includes a frame body, cylinders, a guide pillar, and supporting rollers; the frame body is mounted on the bracket; the number of the cylinders is two, and the cylinders are fixed on the left side and the right side of the frame body respectively; one end of the guide pillar is connected to a cylinder rod of the cylinder and is parallel to the axis of the cylinder, and the other end thereof matches the shaft sleeve; the shaft sleeve is mounted on the frame body, and the supporting rollers are mounted at both ends of the frame body; the mobile feeder consists of an upper portion and a lower portion, the upper portion is located above the bracket, the structure of the upper portion is the same as the structure of the fixing gripper, the lower portion is located below the bracket and includes a frame formed by splicing steel plates, the upper portion of the bracket passes through the frame, and the mobile feeder is connected with the mobile transmission device; the mobile transmission device includes a stepping motor, a coupling, a lead screw front support, a lead screw rear support, a lead screw, linear guide rails, a slider and a bearing; the two parallel linear guide rails are mounted on the bracket and form a moving pair with the slider; the upper end of the lead screw front support is connected with the slider, the lower end thereof is connected with the mobile feeder; the front end of the lead screw is in screw-thread fit with the lead screw front support, the rear end thereof is supported on the lead screw rear support through the bearing, the lead screw rear support is mounted on the bracket, and the lead screw is connected with the stepping motor through the coupling.

The clamping mechanism may include a front end clamping mechanism and a shape steel punching and pressing mechanism; the shape steel punching and pressing mechanism is used to press the rear end of the workpiece; and the front end clamping mechanism clamps the front end of the workpiece; the front end clamping mechanism includes an upper cylinder, an upper cylinder frame, a guide post, a guide sleeve, a pressing plate, left and right cylinders, and left and right cylinder blocks; the upper cylinder frame is fixed on the bracket, the upper cylinder is mounted on the upper cylinder frame, the front end of a cylinder rod of the upper cylinder is connected with the pressing plate, and the cylinder rod moves downwards to press the workpiece; the two ends of the pressing plate can slide up and down along the guide post through the cooperation of the guide sleeve and the guide post, and the guide post is mounted on the upper cylinder frame; the left and right cylinder blocks are fixed on the bracket, the left and right cylinders are mounted on the left and right cylinder blocks and positioned on the same axis, and the left and right cylinders move towards each other in opposite directions to clamp the workpiece from the left and the right.

The gun head moving mechanism may include a linear movement portion and a portion rotating around the Y-axis; the linear movement portion includes an X-axis module, a Y-axis module, a Z-axis module, and connecting devices; the X-axis module is mounted on the cross beam to implement the movement in the X-axis direction, the Y-axis module is mounted on the X-axis module through the connecting device to implement the movement in the Y-axis direction, and the Z-axis module is mounted on the Y-axis module through the connecting device, to implement the movement in the Z-axis direction; the portion rotating around the Y-axis includes a stepping motor base, a stepping motor, and a connecting shaft; the stepping motor base is mounted on the Z-axis module, the stepping motor is mounted on the stepping motor base, the connecting shaft is assembled at the front end of a spindle of the stepping motor, the connecting shaft is sleeved with the gun head, and the stepping motor drives the gun head to rotate around the Y-axis.

The material conveying system may include a plurality of conveying devices disposed side by side, and the conveying devices each include a conveying bracket, a guiding portion, and an adjusting mechanism; and the guiding portion and the adjusting mechanism are mounted on the conveying bracket.

The material receiving device may include a material receiving bracket and a conveying transmission mechanism, the conveying transmission mechanism is mounted on the material receiving bracket and includes a speed reduction motor, a chain wheel, a chain, a bearing block, and carrier rollers; the speed reduction motor is used for inputting power, the chain and the chain wheel form a transmission pair, to connect a pair of the carrier rollers with each other; the carrier rollers are supported on the bearing block, and the bearing block is mounted on the material receiving bracket.

The dedusting system may include a smoke dust collecting chamber, a pipe, a fan, and a filter absorber; the smoke dust collecting chamber is connected with the outer cover and used for collecting smoke dust generated during cutting, the smoke dust collecting chamber is connected with the filter absorber through the pipe, and the fan is connected with the pipe.

The cylinder, the upper cylinder and the left and right cylinders are connected with a pneumatic system; the pneumatic system includes an air compressor and pipe fittings, and the air compressor is connected with the cylinder, the upper cylinder and the left and right cylinders through the pipe fittings.

Compared with the prior art, the present disclosure achieves the following technical effects: the present disclosure adopts plasma cutting, and the surface quality is obviously improved. Material conveying and cutting are performed by a predetermined program programmed in advance, and the dimensional precision of the machining is well ensured. Workers only need to place a workpiece material on a material conveying system, and the machine tool can perform automatic cutting. The labor intensity of the workers is greatly reduced, the cutting is continuously performed, and the machining efficiency is remarkably improved.

DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

A parts listing is set forth: 1. bracket, 2. cross beam, 3. feeding mechanism, 4. clamping mechanism, 5. gun head moving mechanism, 6. material conveying system, 7. material receiving device, 8. dedusting system, 9. electrical control system, 10. pneumatic system, 11. outer cover, 31. fixing gripper, 32. mobile feeder, 33. mobile transmission device, 311. frame body, 312. cylinder, 313. guide pillar, 314. shaft sleeve, 315. supporting roller, 331. stepping motor, 332. coupling, 333. lead screw front support, 334. lead screw rear support, 335. lead screw, 336. linear guide rail, 337. slider, 338. screw, 339. bearing, 41. upper cylinder, 42. upper cylinder frame, 43. guide post, 44. guide sleeve, 45. pressing plate, 46. left and right cylinders, 47. left and right cylinder blocks, 511. X-axis module, 512. Y-axis module, 513. Z-axis module, 514. connecting plate, 515. connecting seat, 61. conveying bracket, 62. guiding portion, 621. bearing block, 622. guiding long shaft, 623. guide pillar, 624. bearing, 63. adjustment mechanism, 631. optical lever, 632. driving screw, 633. nut, 634. fixed plate, 635. moving plate, 636. shaft sleeve, 637. hand wheel, 638. push rod, 639. supporting roller, 6310. supporting roller frame, 6311. screw, 71. material receiving bracket, 72. conveying transmission mechanism, 721. speed reduction motor, 722. chain wheel, 723. chain, 724. bearing block, 725. carrier roller.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure is to provide a numerically-controlled plasma special-shaped cutting machine tool, to solve the above problems in the prior art, which significantly improves machining accuracy and surface quality, reduces labor intensity of workers and improves production efficiency.

To make the foregoing objective, features, and advantages of the present disclosure clearer and more comprehensible, the present disclosure is further described in detail below with reference to the accompanying drawings and specific embodiments.

As shown in FIGS. 1 to 11, this embodiment provides a numerically-controlled plasma special-shaped cutting machine tool. The machine tool is composed of a bracket 1, a cross beam 2, a feeding mechanism 3, a clamping mechanism 4, a gun head moving mechanism 5, a material conveying system 6, a material receiving device 7, a dedusting system 8, an electrical control system 9, a pneumatic system 10, and an outer cover 11.

Specifically, the bracket 1 is a support of the machine tool, and is formed mainly by welding square pipes to a steel plate. The cross beam 2 and the clamping mechanism 4 are fixed at the front end of the bracket 1, the feeding mechanism 3 is installed on the middle portion of the bracket 1, a plasma generator is placed at the tail of the bracket 1, and an air pipe and a cable and the like are attached thereto. Four steel plates are welded to base plates at four corners of the bracket 1, holes are machined in the steel plates, and the steel plates can be mounted on the ground or a platform.

Figure 2:
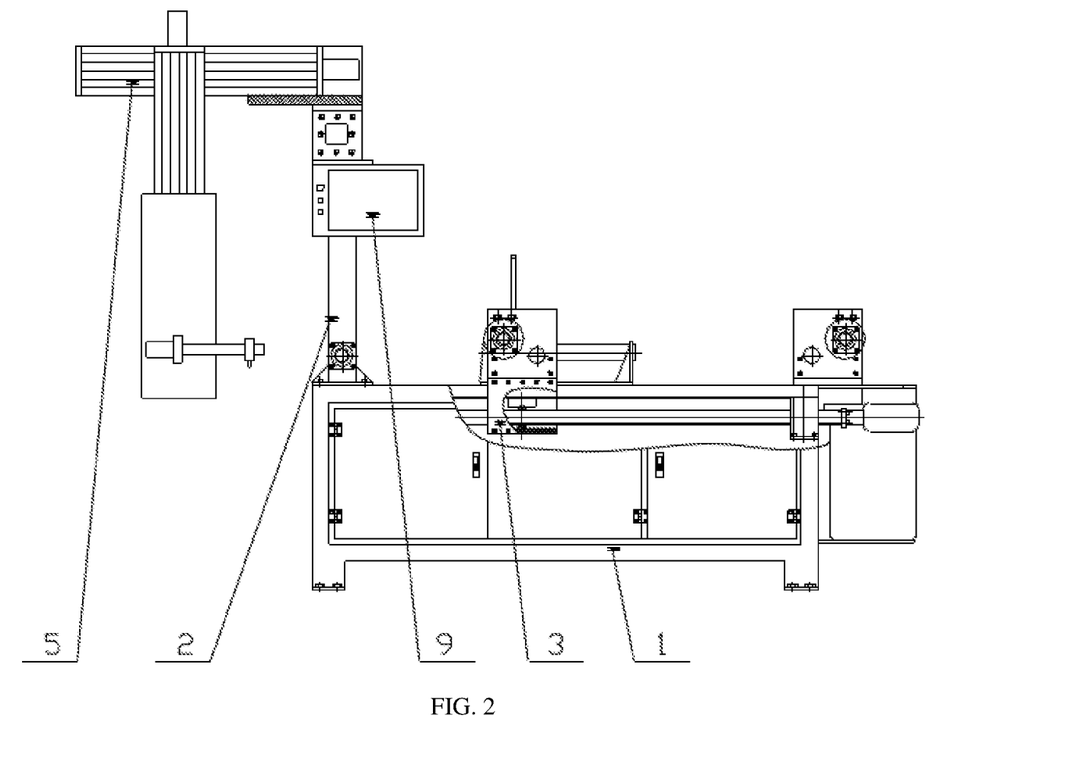
FIG. 2 is a front view of a machine tool where a material conveying system, a material receiving device, a dedusting system, a pneumatic system, and an outer cover are removed according to the present disclosure.
Figure 3:
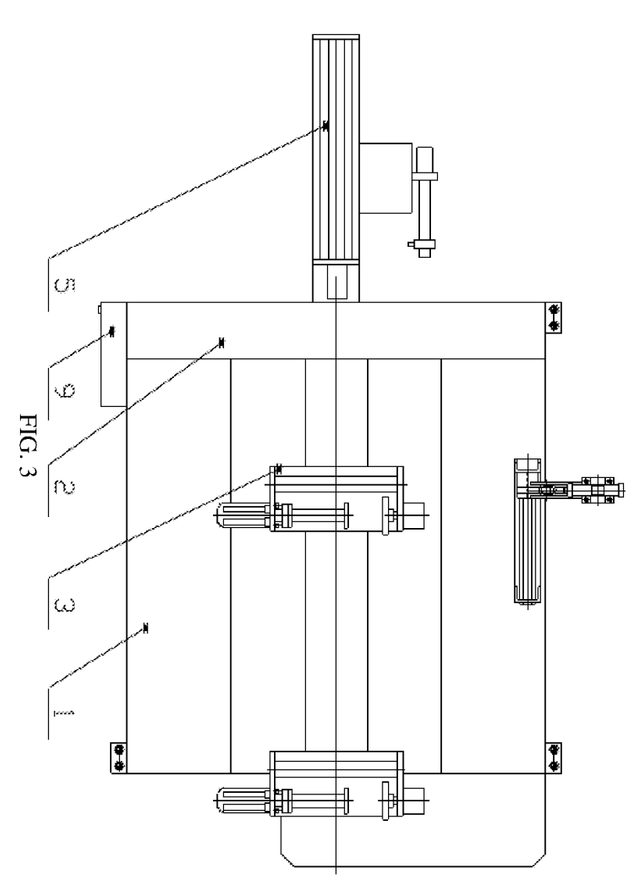
FIG. 3 is a vertical view of a machine tool where a material conveying system, a material receiving device, a dedusting system, a pneumatic system, and an outer cover are removed according to the present disclosure.
Figure 4:
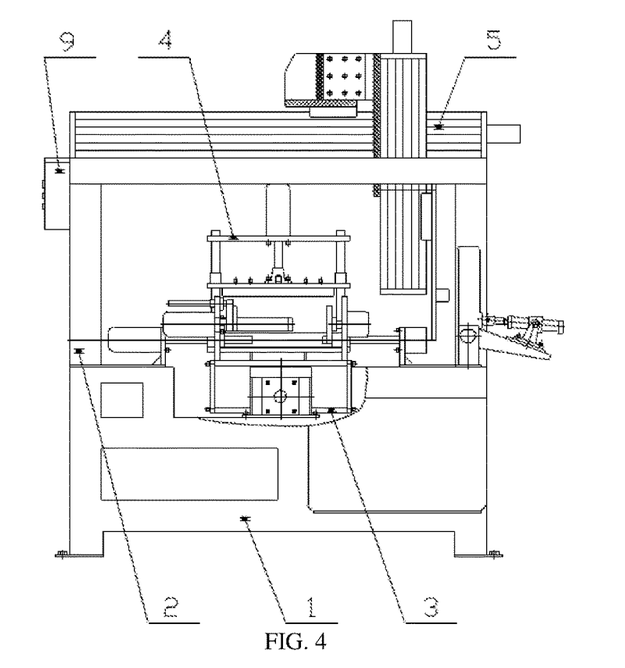
FIG. 4 is a right elevation of a machine tool where a material conveying system, a material receiving device, a dedusting system, a pneumatic system, and an outer cover are removed according to the present disclosure.

The cross beam 2 is a door type structural frame which is mounted on the bracket 1 and is formed by welding shape steel, a workpiece (groove steel or I steel) passes through the middle thereof, and the gun head moving mechanism 5 is mounted on an upper beam thereof.

Figure 5A:
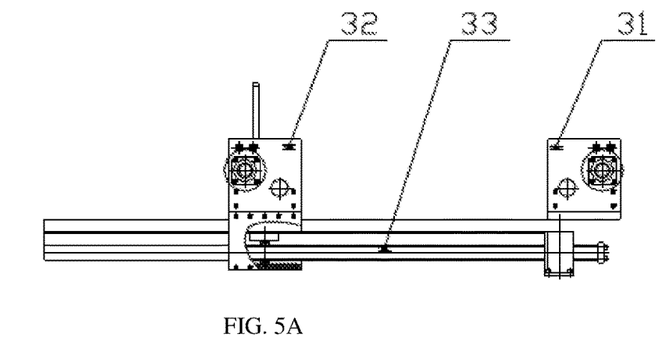
FIGS. 5A, 5B and 5C are assembly diagrams of a feeding mechanism according to the present disclosure.
Figure 5B:
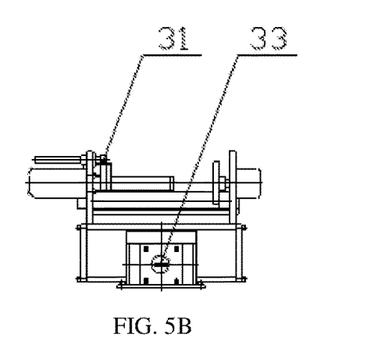
Figure 5C:
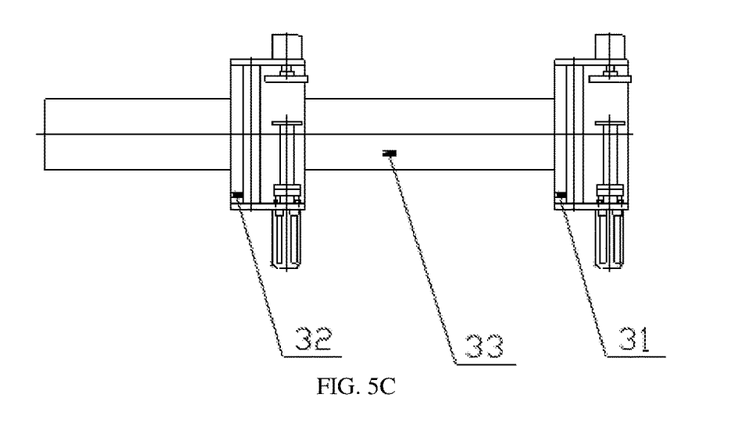

The feeding mechanism 3 includes a fixing gripper 31, a mobile feeder 32, and a mobile transmission device 33. The function of the fixing gripper 31 is to clamp the workpiece from the rear end of the workpiece after the workpiece is moved to a set position, and clamp the workpiece by cooperating with the clamping mechanism 4 that clamps the front end of the workpiece; the function of the mobile feeder 32 is clamp the workpiece and send the workpiece to a predetermined position; and the mobile transmission device 33 makes the mobile feeder 32 move forwards and backwards.

Figure 6A:
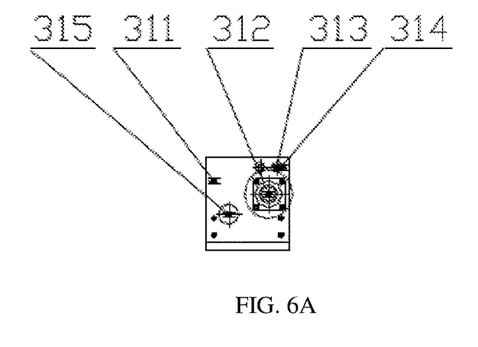
FIGS. 6A, 6B and 6C are assembly diagrams of a fixing gripper according to the present disclosure.
Figure 6B:
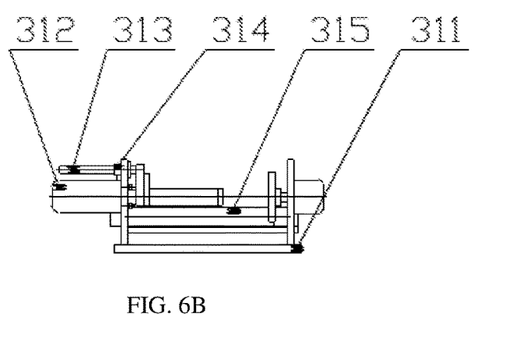
Figure 6C:
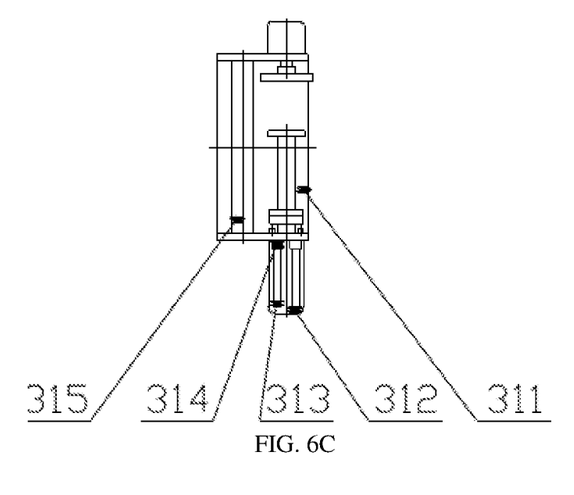

The fixing gripper 31 is mainly composed of a frame body 311, cylinders 312, a guide pillar 313, a shaft sleeve 314, and supporting rollers 315, and the frame body 311 is formed by splicing steel plates and mounted on the bracket 1; the cylinders 312 are a left cylinder and a right cylinder and are fixed on left and right steel plates of the frame body 311 respectively; cylinder rods of the two cylinders 312 move towards each other in opposite directions to clamp the workpiece or move away from each other in opposite directions to loosen the workpiece; one end of the guide pillar 313 is connected to the cylinder rod of the cylinder 312 and is parallel to the axis of the cylinder 312, and the other end thereof matches the shaft sleeve 314; the shaft sleeve 314 is mounted on the frame body 311; when the cylinder rod is stretched out or drawn back, the guide pillar 313 slides in the shaft sleeve 314 at the same time, and plays a role of guiding and supporting to ensure the smooth movement of the cylinder rod; the cylinder rod is firm when abutting against the workpiece, and the stress is uniform, so that the cylinder rod is not biased; the supporting rollers 315 are mounted at both ends of the frame body 311 and can freely rotate, and the workpiece is placed thereon and can be conveyed forward easily.

The mobile feeder 32 is divided into an upper portion above the bracket 1 and a lower portion below the bracket 1. The portion above the bracket 1 is identical to the fixing gripper 31, and the portion below the bracket 1 is a frame formed by splicing steel plates. Two square pipes on the upper portion of the bracket 1 pass through the frame, and a lead screw front support 333 is mounted on a frame base plate, to connect the fixing gripper 31 with the mobile transmission device 33.

Figure 7A:
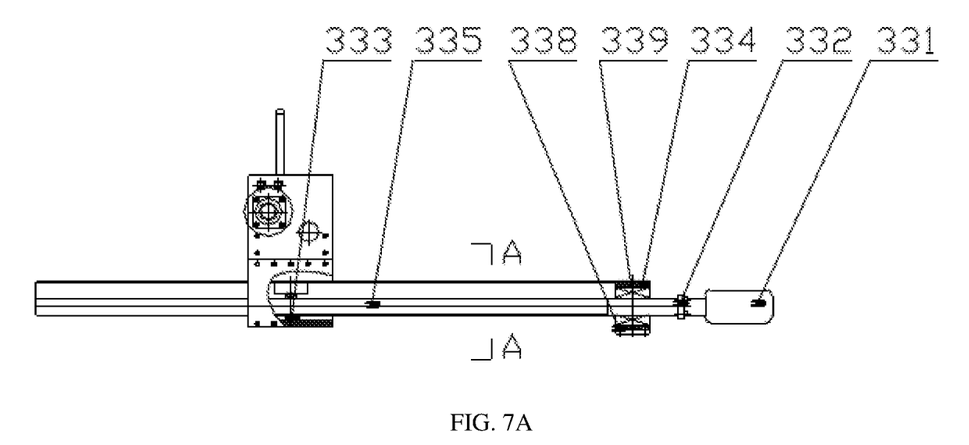
FIGS. 7A and 7B are assembly diagrams of a mobile transmission device according to the present disclosure.
Figure 7B:
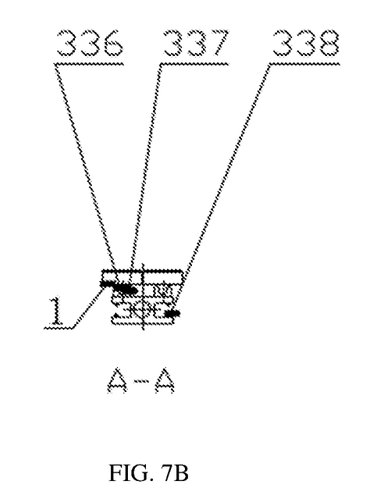

The mobile transmission device 33 includes a stepping motor 331, a coupling 332, a lead screw front support 333, a lead screw rear support 334, a lead screw 335, linear guide rails 336, a slider 337, a screw 338, a bearing 339, and the like; the two parallel linear guide rails 336 are mounted on the bracket 1 and fixed and form a moving pair with the slider 337; the upper end of the lead screw front support 333 is connected with the slider 337, the lower end thereof is connected with the mobile feeder 32, and the lead screw front support 333 and the lead screw 335 form a thread pair; the front end of the lead screw 335 is in screw-thread fit with the lead screw front support 333, the rear end thereof is supported on the lead screw rear support 334 through the bearing 339, and the lead screw rear support 334 is mounted on the bracket 1, to ensure coaxiality with the lead screw front support 333; the coupling 332 is mounted at the rear end of the lead screw 335, and the lead screw 335 is connected with the stepping motor 331; when the stepping motor 331 operates, the lead screw 335 is driven to rotate by the coupling 332, and the lead screw front support 333 is driven to move by the thread pair composed of the lead screw 335 and the lead screw front support 333. Since the lead screw front support 333 is fixed on the slider 337, cannot rotate and can only move linearly, the rotation of the stepping motor 331 is converted into the linear movement of the lead screw front support 333, and the lead screw front support 333 is connected with the mobile feeder 32, thereby driving the mobile feeder 32 to move forwards and backwards.

Figure 8A:
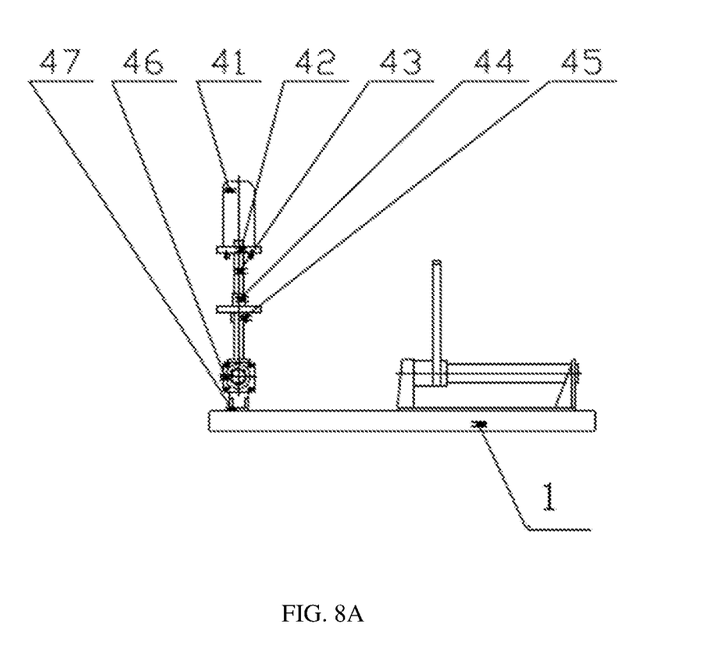
FIGS. 8A and 8B are assembly diagrams of a clamping mechanism according to the present disclosure.
Figure 8B:
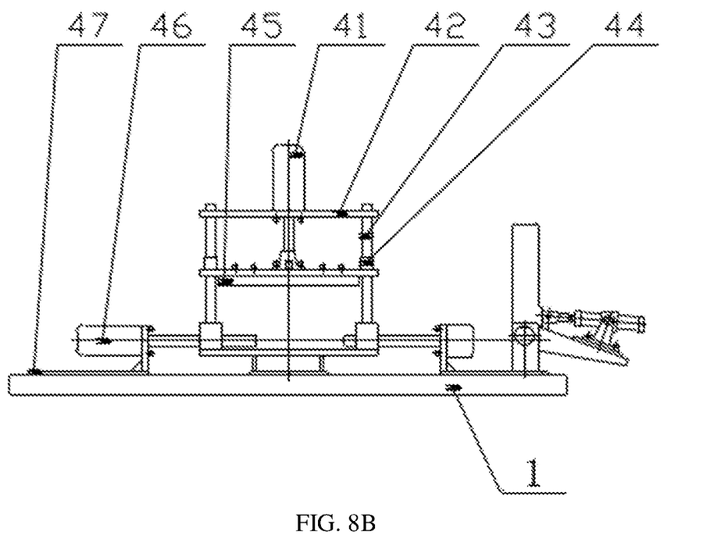

The function of the clamping mechanism 4 is to limit the degree of freedom of the workpiece when the workpiece reaches a predetermined position, and clamp the workpiece from the top, left and right. The clamping mechanism 4 includes a front end clamping mechanism and a shape steel punching and pressing mechanism. The shape steel punching and pressing mechanism is used to press the rear end of the workpiece, and the structure thereof is in the prior art; and the front end clamping mechanism clamps the front end of the workpiece.

The front end clamping mechanism mainly includes an upper cylinder 41, an upper cylinder frame 42, a guide post 43, a guide sleeve 44, a pressing plate 45, left and right cylinders 46, left and right cylinder blocks 47, and the like. The upper cylinder frame 42 is fixed on the bracket 1, the upper cylinder 41 is mounted on the upper cylinder frame 42, the front end of a cylinder rod is connected with the pressing plate 45, and the cylinder rod moves downwards to press the workpiece; in order to ensure the smoothness of the movement of the pressing plate 45, the two ends of the pressing plate 45 can slide up and down along the guide post 43 through the cooperation of the guide sleeve 44 and the guide post 43; the guide post 43 is mounted on the upper cylinder frame 42 to play a role of guiding and supporting, the guide post 43 is sleeved with the guide sleeve 44, the left and right cylinder blocks 47 are fixed on the bracket 1, the left and right cylinders 46 are mounted on the left and right cylinder blocks 47, and the two cylinders are positioned on the same axis and move towards each other in opposite directions to clamp the workpiece from the left and the right.

Figure 9A:
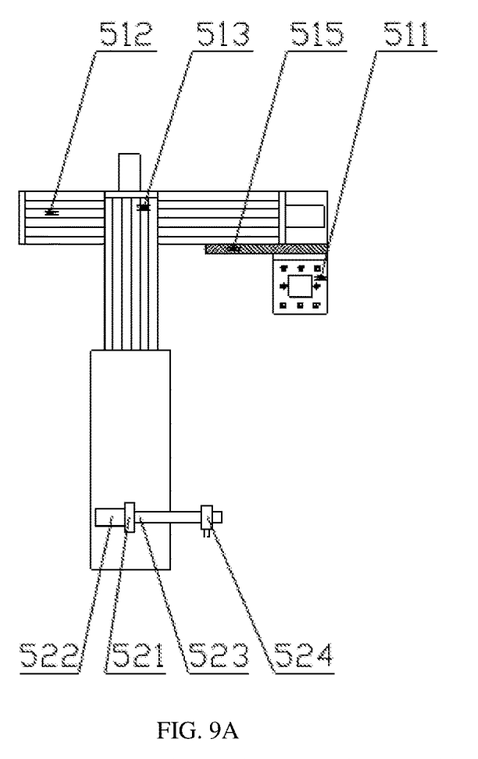
FIGS. 9A and 9B are assembly diagrams of a gun head moving mechanism according to the present disclosure.
Figure 9B:
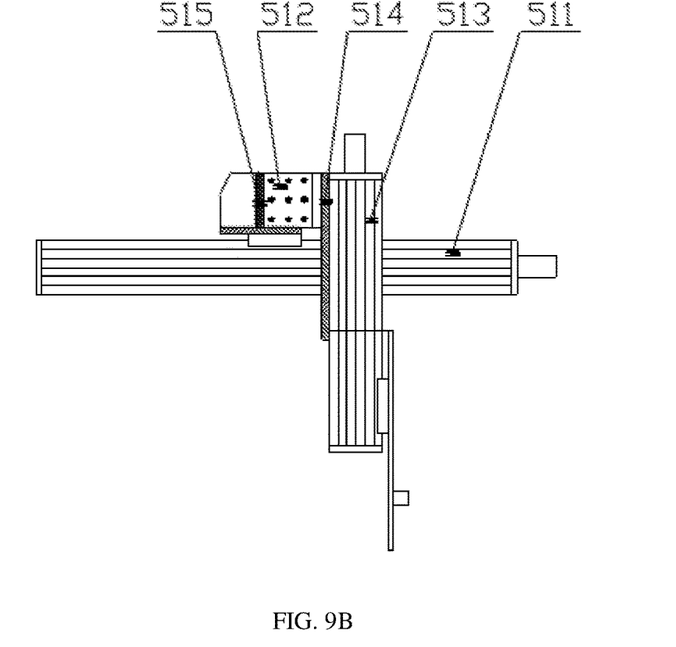

The gun head moving mechanism 5 is an execution mechanism of the machine tool, and the function thereof is to cut the workpiece into a desired shape according to a programmed program after the workpiece is conveyed to a predetermined position and clamped. For this, a gun head needs to be capable of implementing a combined movement of the linear movement in three directions of the X-axis, the Y-axis, and the Z-axis, and the rotation around the Y-axis. The linear movement is implemented through a module, and the rotation around the Y-axis is implemented through the stepping motor. The gun head moving mechanism is mainly composed of a linear movement portion 51 and a portion 52 rotating around the Y-axis. The linear movement portion 51 includes an X-axis module 511, a Y-axis module 512, a Z-axis module 513 and connecting devices for connecting the modules. The connecting device can be a connecting plate 514 or a connecting base 515, the three modules can adopt conventional lead screw transmission mechanisms which are each composed of a motor, a ball screw, a nut, a linear guide rail, and a slider and can implement the linear movement of each axis.

Specifically, the X-axis module 511 is mounted on the cross beam 2 to implement the movement in the X-axis direction, the Y-axis module 512 is mounted on the X-axis module 511 through the connecting base 515 to implement the movement in the Y-axis direction, and the Z-axis module 513 is mounted on the Y-axis module 512 through the connecting plate 514, to implement the movement in the Z-axis direction. The portion 52 rotating around the Y-axis includes a stepping motor base 521, a stepping motor 522, a connecting shaft 523, a gun head 524, and the like. The stepping motor base 521 is mounted on the Z-axis module 513, the stepping motor 522 is mounted thereon, and the connecting shaft 523 is assembled at the front end of a spindle of the stepping motor 522 and is coaxial with the spindle; the connecting shaft 523 is sleeved with the gun head 524, and the gun head 524 is fixed; and when the stepping motor 522 rotates, the gun head 524 is driven to rotate around the Y-axis.

Figure 10A:
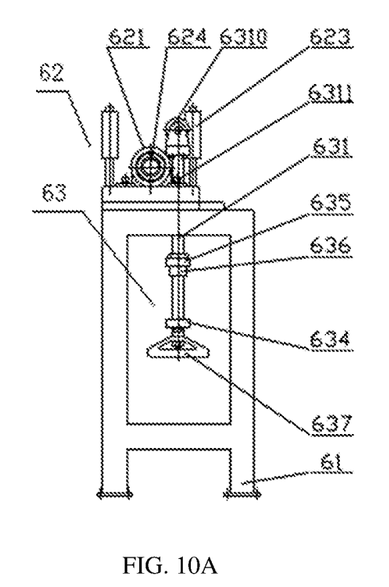
FIGS. 10A, 10B and 10C are assembly diagrams of a material conveying system according to the present disclosure.
Figure 10B:
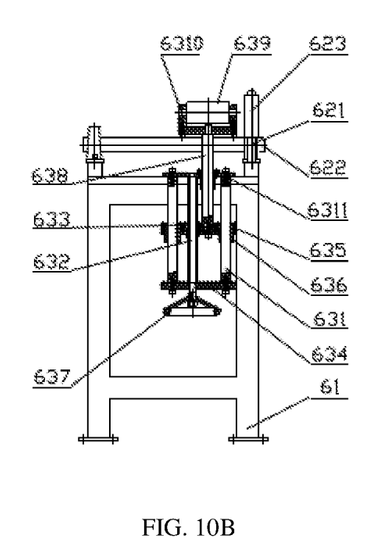
Figure 10C:
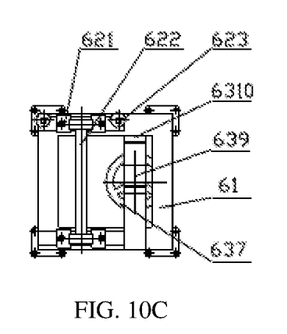

The workpiece is generally I steel or groove steel of a varying length ranging from 6 meters to 12 meters. The material conveying system 6 can horizontally convey workpieces of various specifications into the feeding mechanism. The material conveying system 6 is composed of a plurality of identical conveying devices, and the plurality of devices are arranged in a row to form a conveying system, and the workpiece is placed thereon, and can be conveyed by manual pushing. The conveying device is composed of a conveying bracket 61, a guiding portion 62, and an adjusting mechanism 63. The conveying bracket 61 is a support of the device, and the guiding portion 62 and the adjusting mechanism 63 are mounted thereon. The guiding portion 62 guides and restricts a conveying path of the workpiece, so that the workpiece is horizontally and linearly conveyed forwards, and the adjusting mechanism 63 can adjust workpieces of various types to be level according to the kinds of the workpieces.

Specifically, the guiding portion 62 in the embodiment includes bearing blocks 621, a guiding long shaft 622, guide pillars 623, bearings 624, and the like. The bearing blocks 621 are supports of the guiding long shaft 622 and are connected to the conveying bracket 61 through bolts. The bearing blocks 621 are a left bearing block and a right bearing block, and the bearings 624 are assembled in the bearing blocks 621; the guiding long shaft 622 is a shaft part and is supported on the bearing blocks 621 through the bearings 624 at both ends, and one end of angle steel is pressed thereon; the guide pillar 623 is composed of a guide sleeve and a pillar body, the guide sleeve is mounted on the pillar body and can rotate around the pillar body, a thread is machined at the end of the pillar body, the pillar body is screwed on the conveying bracket 61, the diameters of the guide pillars 623 are different, and the guide pillars 623 can be replaced according to the kind of a conveyed material.

The adjusting mechanism 63 includes optical levers 631, a driving screw 632, a nut 633, a fixed plate 634, a moving plate 635, a shaft sleeve 636, a hand wheel 637, a push rod 638, a supporting roller 639, a supporting roller frame 6310, screws 6311, and the like. The optical levers 631 are a left optical lever and a right optical lever and play a role of guiding. The upper end of the optical lever 631 is fixed on the conveying bracket 61 through the screw 6311, the lower end thereof is also fixed on the fixed plate 634 through the screw 6311, the optical lever 631 matches the shaft sleeve 636, and the shaft sleeve 636 can slide up and down along the optical lever 631; the shaft sleeve 636 is fixed on the moving plate 635 through the screw 6311, the driving screw 632 abuts between the conveying bracket 61 and the fixed plate 634, and forms a thread pair with the nut 633; the nut 633 is fixed on the moving plate 635 through the screw 6311, the hand wheel 637 is assembled by key joint at the position of the driving screw 632 extending out of the fixed plate 634, and a nut is screwed at the end of the driving screw 632 to block the hand wheel 637 to prevent the hand wheel 637 from falling; the push rod 638 is a shaft part, the upper end thereof is connected with the supporting roller frame 6310 through an end thread, the lower end thereof is fixed on the moving plate 635 through the screw 6311, the middle portion thereof matches the shaft sleeve 636, and the push rod 638 can slide up and down along the shaft sleeve 636; the shaft sleeve 636 is fixed on the conveying bracket 61 through the screw 6311; the supporting roller frame 6310 is formed by assembling a base plate and two side plates; the supporting roller frame 6310 is connected with the push rod 638 through the base plate, and the supporting roller 639 is a shaft part supported on the two side plates of the supporting roller frame 6310 and capable of rotating freely. When the hand wheel 637 is rotated, the driving screw 632 drives the nut 633 to move. Due to the limitation of the moving plate 635 and the optical levers 631, the rotation of the driving screw 632 is converted into the up-and-down sliding of the moving plate 635 along the optical levers 631, and the push rod 638 and the supporting roller 639 are driven to move up and down.

Figure 11A:
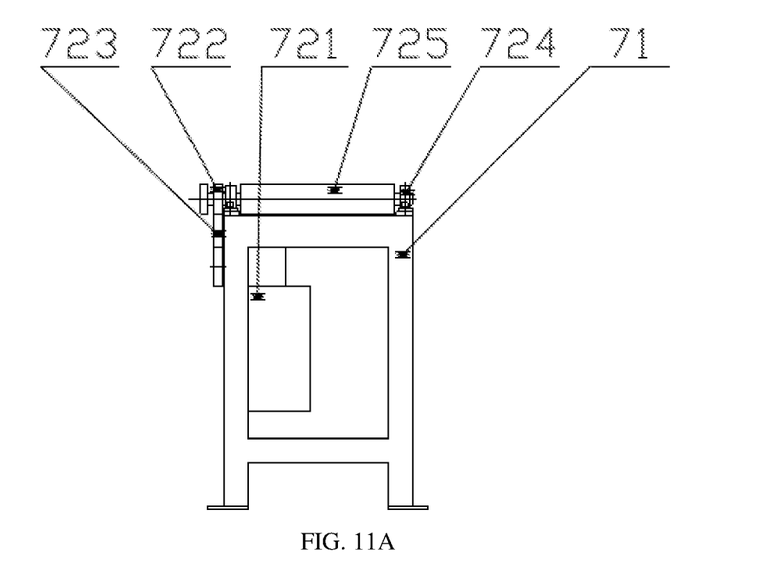
FIGS. 11A and 11B are assembly diagrams of a material receiving device according to the present disclosure.
Figure 11B:
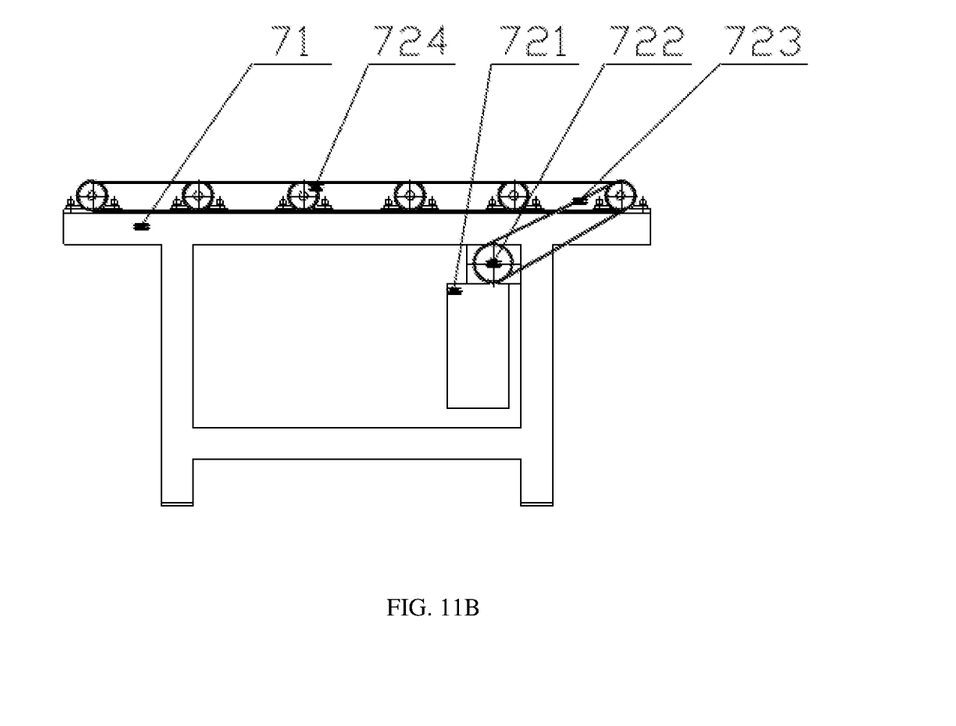

The function of the material receiving device 7 is to receive a finished workpiece formed by cutting and convey the finished workpiece to a material box outside the machine tool. The material receiving device 7 is composed of a material receiving bracket 71 and a conveying transmission mechanism 72. The material receiving bracket 71 is a support of the device and is formed by welding shape steel, and the conveying transmission mechanism 72 is installed on the material receiving bracket 71. The conveying transmission mechanism 72 includes a speed reduction motor 721, a chain wheel 722, a chain 723, a bearing block 724, carrier rollers 725, and the like. Power is input by the speed reduction motor 721, the chain 723 and the chain wheel 722 form a transmission pair, to connect a group of carrier rollers 725 with each other, the carrier rollers 725 are supported on the bearing block 724, the bearing block 724 is mounted on the material receiving bracket 71, and the speed reduction motor 721 rotates and drives drive the carrier rollers 725 to rotate through the transmission of the chain and the transmission pair, thereby driving the finished workpiece falling thereon to move, to achieve output.

Figure 1:
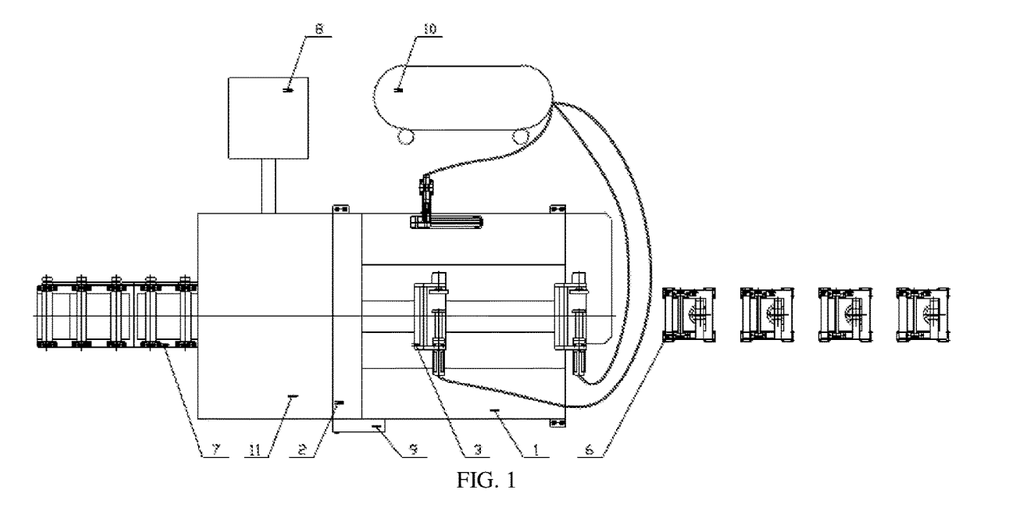
FIG. 1 is an assembly diagram of a numerically-controlled plasma special-shaped cutting machine tool according to the present disclosure.

The function of the dedusting system 8 is to collect and purify smoke dust generated by the cutting to reduce the pollution to the surrounding environment. The dedusting system mainly includes a smoke dust collecting chamber, a pipe, a fan, a filter absorber, and the like. The smoke dust collecting chamber collects the smoke dust generated by the cutting. Under the action of the fan, the smoke dust enters the filter absorber through the pipe and is purified by the filter absorber for removal of harmful impurities and then is subjected to up-to-standard discharge.

The function of the electrical control system 9 is to control the action of executing elements such as the motor to ensure that the executing elements operate in accordance with instructions. The electrical control system 9 mainly controls: (1) operation of motors, including motors of the feeding mechanism, the gun head moving mechanism, and the material receiving device; (2) action of executing components, controlled through signals and switches, including action of a feeding mechanism cylinder, a clamping mechanism cylinder and each motor. The operation of the motors and the action of the executing components are controlled by a pre-programmed program, and a series of functions such as feeding, clamping, cutting, and discharging are achieved by running the program. The electrical control system is composed of lines and various electrical apparatus elements, as long as the control requirements are met. The electrical control system 9 is finally integrated into a control box, and the control box is mounted on the cross beam that is convenient to operate.

The function of the pneumatic system 10 is to provide stable compressed air for cylinders to ensure that the cylinders clamp or loosen the workpiece reliably. The pneumatic system mainly includes an air compressor, pipe fittings, various control valves, and the like. The air compressor provides an air source, the pipe fittings are connected to air compressor and the cylinders, and the various control valves control or regulate the direction, flow or pressure of gas.

The function of the outer cover 11 is to enhance the visual attractiveness of the machine tool, so that the machine tool looks attractive and smooth in appearance, and is coordinated with the surrounding environment. The outer cover 11 is mainly formed by sheet metal machining such as shearing and bending, and the outer surface is subjected to powder coating.

The operating process of the numerically-controlled plasma special-shaped cutting machine tool of the present disclosure is as follows: the material receiving device 7, the dedusting system 8, the electrical control system 9 and the pneumatic system 10 are started, a workpiece material (groove steel or I steel with a length of 9-12 m) is placed on the material conveying system 6 and manually pushed forwards into the feeding mechanism 3, and a numerical control program is started to enter an automatic operating mode; the mobile feeder 32 clamps the workpiece, moves forwards to a set position, loosens the workpiece and then draws back to an initial position; the front end clamping mechanism clamps the workpiece from the top, the left and the right, the fixing gripper 31 clamps the workpiece from the rear end, and the shape steel punching and pressing mechanism presses the rear end of the workpiece; the gun head moving mechanism 5 drives the gun head 524 to cut the workpiece according to a pre-programmed program; the finished workpiece formed by cutting falls into the material receiving device 7 and is conveyed into a specified material box outside the machine tool, and at the same time, the clamping mechanism 4 loosens the workpiece; at this point, one cycle of cutting the workpiece ends, and the mobile feeder 32 clamps the workpiece again to move forward to start the next cycle.

Several examples are used for illustration of the principles and implementation methods of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A numerically-controlled plasma special-shaped cutting machine tool, comprising:
   a bracket, a cross beam, a feeding mechanism, a clamping mechanism, a gun head moving mechanism, a material conveying system, a material receiving device, a dedusting system, an electrical control system, and an outer cover;
   wherein the cross beam and the clamping mechanism are fixed at a front end of the bracket, the feeding mechanism is mounted on a middle portion of the bracket, the gun head moving mechanism is mounted on the cross beam, a gun head is mounted on the gun head moving mechanism to cut a workpiece, and the gun head is connected with a plasma generator; the material conveying system is mounted at one end of the bracket and used for conveying the workpiece into the feeding mechanism; the material receiving device is disposed at another end of the bracket and used for receiving a finished workpiece formed by cutting and conveying the finished workpiece into a material box outside the machine tool; and the dedusting system is connected to the outer cover and used for collecting and purifying smoke dust generated during cutting;
   wherein the material conveying system comprises a plurality of conveying devices disposed side by side, and the plurality of conveying devices each comprise a conveying bracket, a guiding portion, and an adjusting mechanism; and the guiding portion and the adjusting mechanism are mounted on the conveying bracket;
   wherein the feeding mechanism comprises a fixing gripper, a mobile feeder, and a mobile transmission device;
   the fixing gripper comprises a frame body, cylinders, guide pillars, and supporting rollers; the frame body is mounted on the bracket; a number of the cylinders is two, and the cylinders are fixed on a left side and a right side of the frame body respectively; one end of each guide pillar is connected to a cylinder rod of corresponding cylinder of the cylinders and is parallel to an axis of the corresponding cylinder, and another end of the guide pillar matches a shaft sleeve; the shaft sleeve is mounted on the frame body, and the supporting rollers are mounted at both ends of the frame body;

the mobile feeder consists of an upper portion and a lower portion, the upper portion is located above the bracket, a structure of the upper portion corresponds to a structure of the fixing gripper, the lower portion is located below the bracket and comprises a frame formed by splicing steel plates, the upper portion of the bracket passes through the frame, and the mobile feeder is connected with the mobile transmission device;

the mobile transmission device comprises a stepping motor, a coupling, a lead screw front support, a lead screw rear support, a lead screw, two parallel linear guide rails, a slider and a bearing; the two parallel linear guide rails are mounted on the bracket and form a moving pair with the slider; an upper end of the lead screw front support is connected with the slider, a lower end of the lead screw front support is connected with the mobile feeder; a front end of the lead screw is in screw-thread fit with the lead screw front support, a rear end is supported on the lead screw rear support through the bearing, the lead screw rear support is mounted on the bracket, and the lead screw is connected with the stepping motor through the coupling.

2. The numerically-controlled plasma special-shaped cutting machine tool according to claim 1, wherein the cross beam is a door type structural frame which is mounted on the bracket, the workpiece passes through a middle of the cross beam, and the gun head moving mechanism is mounted on an upper beam of the cross beam; the electrical control system is integrated in a control box, and the control box is mounted on the cross beam.

3. The numerically-controlled plasma special-shaped cutting machine tool according to claim 1, wherein the clamping mechanism comprises a front end clamping mechanism and a shape steel punching and pressing mechanism; the shape steel punching and pressing mechanism is used to press a rear end of the workpiece; and the front end clamping mechanism clamps a front end of the workpiece;

the front end clamping mechanism comprises an upper cylinder, an upper cylinder frame, a guide post, a guide sleeve, a pressing plate, left and right cylinders, and left and right cylinder blocks; the upper cylinder frame is fixed on the bracket, the upper cylinder is mounted on the upper cylinder frame, the front end of a cylinder rod of the upper cylinder is connected with the pressing plate, and the cylinder rod of the upper cylinder moves downwards to press the workpiece; two ends of the pressing plate can slide up and down along the guide post through a cooperation of the guide sleeve and the guide post, and the guide post is mounted on the upper cylinder frame; the left and right cylinder blocks are fixed on the bracket, the left and right cylinders are mounted on the left and right cylinder blocks and positioned on a same axis, and the left and right cylinders move towards each other in opposite directions to clamp the workpiece from the left side and the right side.

4. The numerically-controlled plasma special-shaped cutting machine tool according to claim 3, wherein the gun head moving mechanism comprises a linear movement portion and a portion rotating around a Y-axis;

the linear movement portion comprises an X-axis module, a Y-axis module, a Z-axis module, and a connecting device; the X-axis module is mounted on the cross beam to implement a movement in an X-axis direction, the Y-axis module is mounted on the X-axis module through the connecting device to implement a movement in a Y-axis direction, and the Z-axis module is mounted on the Y-axis module through the connecting device, to implement a movement in a Z-axis direction;

the portion rotating around the Y-axis comprises a stepping motor base, a stepping motor, and a connecting shaft; the stepping motor base is mounted on the Z-axis module, the stepping motor is mounted on the stepping motor base, the connecting shaft is assembled at a front end of a spindle of the stepping motor, the connecting shaft is sleeved with the gun head, and the stepping motor drives the gun head to rotate around the Y-axis.

5. The numerically-controlled plasma special-shaped cutting machine tool according to claim 1, wherein the material receiving device comprises a material receiving bracket and a conveying transmission mechanism, the conveying transmission mechanism is mounted on the material receiving bracket and comprises a speed reduction motor, a chain wheel, a chain, a bearing block, and carrier rollers; the speed reduction motor is used for inputting power, the chain and the chain wheel form a transmission pair, to connect a pair of the carrier rollers with each other; the carrier rollers are supported on the bearing block, and the bearing block is mounted on the material receiving bracket.

6. The numerically-controlled plasma special-shaped cutting machine tool according to claim 1, wherein the dedusting system comprises a smoke dust collecting chamber, a pipe, a fan, and a filter absorber; the smoke dust collecting chamber is connected with the outer cover and used for collecting smoke dust generated during cutting, the smoke dust collecting chamber is connected with the filter absorber through the pipe, and the fan is connected with the pipe.

7. The numerically-controlled plasma special-shaped cutting machine tool according to claim 3, wherein the cylinders, the upper cylinder and the left and right cylinders are connected with a pneumatic system; the pneumatic system comprises an air compressor and pipe fittings, and the air compressor is connected with the cylinders, the upper cylinder and the left and right cylinders through the pipe fittings.

* * * * *